C. W. HELDEN.
Vehicle-Wheel.
No. 198,384. Patented Dec. 18, 1877.
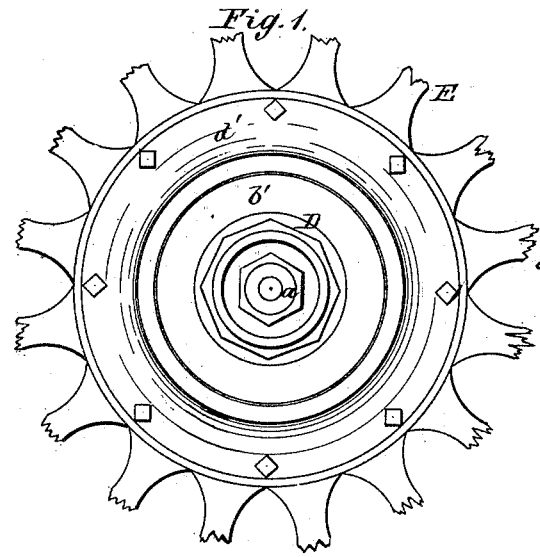
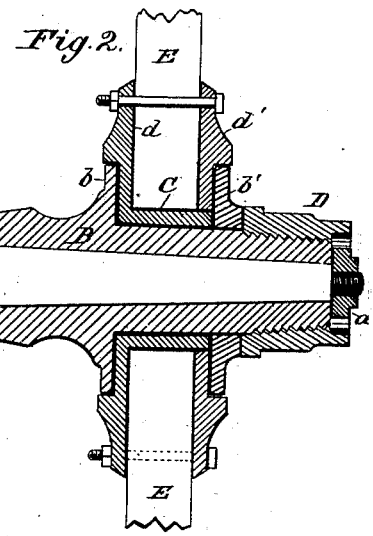
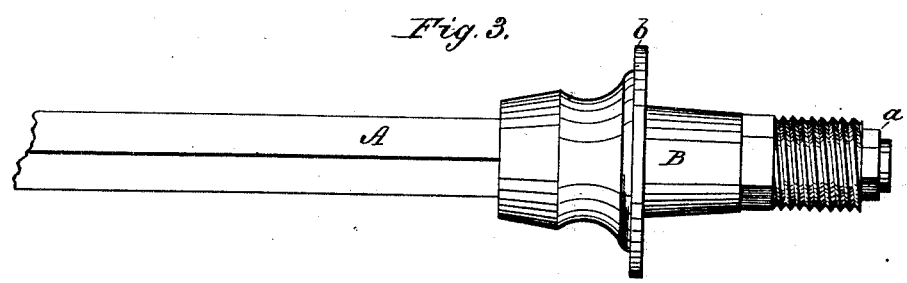
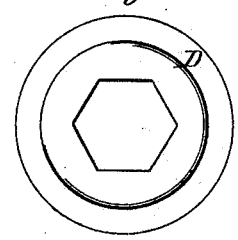
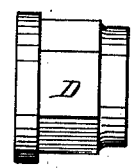
WITNESSES:
W. W. Hollingsworth
E. des. W. Byrn
INVENTOR:
Charles W. Helden
BY
ATTORNEYS.

UNITED STATES PATENT OFFICE.

CHARLES W. HELDEN, OF FLORENCE, ALABAMA.

IMPROVEMENT IN VEHICLE-WHEELS.

Specification forming part of Letters Patent No. 198,384, dated December 18, 1877; application filed October 23, 1877.

*To all whom it may concern:*

Be it known that I, CHARLES W. HELDEN, of Florence, in the county of Lauderdale and State of Alabama, have invented a new and Improved Vehicle-Wheel; and I do hereby declare that the following is a full, clear, and exact description of the same, reference being had to the accompanying drawing, forming part of this specification, in which—

Figure 1 is a side view; Fig. 2, a longitudinal section; Fig. 3, a side view of the fixed hub and axle. Figs. 4 and 5 are details of the fastening-nut.

My invention relates to an improvement in vehicle-wheels, designed to secure greater strength and durability, and to obviate the welding of the axle. It consists in the peculiar construction and arrangement of the hub and its connection, in which the extremity of the axle is tapered squarely to the end, and a flanged non-rotating hub fitted over the same with a square perforation, while the box is provided with a flange and revolves upon the fixed hub, its flange being bolted to a collar upon the opposite side of the spokes, so as to hold the latter in place, all as hereinafter more fully described.

In the drawings, A represents the axle, which is tapered squarely toward its extremity, and over which is rigidly fitted the fixed hub B, the latter being held in place upon the end of the axle by a nut, *a*, screwed upon the threaded end of said axle. C is the tubular box of the wheel, which encompasses the fixed axle, but instead of extending the length of the hub, as usual, is made shorter, and is contained between a flange, *b*, on the fixed hub and an annular collar, *b'*, upon the opposite side, which box and its attached wheel are kept from slipping off by a nut, D, screwed upon the threaded end of the fixed hub. The box C is formed with a flange, *d*, from one side, between which and an annular collar, *d'*, the spokes E are bolted and held, the flange *d* and collar *d'* each being recessed upon their outer faces to receive the flange *b* and collar *b'* of the fixed hub, thus making the adjacent edges of the rotating and fixed parts of the hub flush, so as to better exclude dirt.

In constructing my improved wheel the following will be about the dimension of the parts for the average-sized wheel: The axle A, about one inch square bar of iron; fixed hub B, about six inches long, with a flange about three inches in diameter; the box-flange *d* and collar *a'*, about six inches each in diameter; thickness of collar *b'*, three-eighths of an inch; spoke-flanges, five-eighths of an inch thick at bearing, tapered to one-eighth at the outer edge; the box, one and three-eighths of an inch long and three-eighths of an inch thick.

I am aware of the fact that vehicle-hubs have heretofore been constructed which resemble mine, examples of which are to be seen in the patents to Beech, September 11, 1866, and Brown, December 23, 1873; but my particular arrangement of parts presents the following distinctive advantages: In both the above cases the axle and the hub have to be fitted at a machine-shop, and there is neither any means of taking up wear to prevent rattling, nor to correct the dishing of the wheel. In my invention the plain tapering angular axle, without collar or shoulder, permits the same to be not only readily rolled when new, or drawn out by an ordinary blacksmith when adapting old axles to my invention, but it allows the hub B to be forced up by washers upon the tapering axle from time to time to take up wear and prevent rattle; and when the surfaces between B and C become worn, so as to cause the wheel to dish, B may be slipped off of the axle, turned partially around to bring new wearing-surfaces in contact, and thus correct the dish.

Having thus described my invention, what I claim as new is—

The non-rotating hub B, having flange *b*, in combination with the plain tapering angular axle A, the nut *a*, the flanged box C, spoke-collar *d'*, collar *b'*, and nut D, substantially as and for the purpose described.

CHARLES W. HELDEN.

Witnesses:
J. B. WHITE,
A. D. LEWIS.